Dec. 23, 1958 J. AUGUSTIN 2,865,983

AUTOMATIC ATTACHMENT SWITCH-OVER DEVICE, IN PARTICULAR FOR TELEPRINTERS

Filed March 19, 1957

3 Sheets-Sheet 1

INVENTOR
J. AUGUSTIN

BY

ATTORNEY

INVENTOR
J. AUGUSTIN
BY Albert Pesso
ATTORNEY

Dec. 23, 1958
J. AUGUSTIN
2,865,983
AUTOMATIC ATTACHMENT SWITCH-OVER DEVICE, IN PARTICULAR FOR TELEPRINTERS
Filed March 19, 1957
3 Sheets-Sheet 3

INVENTOR
J. AUGUSTIN
BY
Albert Reiss
ATTORNEY

United States Patent Office 2,865,983

Patented Dec. 23, 1958

2,865,983

AUTOMATIC ATTACHMENT SWITCH-OVER DEVICE, IN PARTICULAR FOR TELEPRINTERS

Johann Augustin, Pforzheim, Germany, assignor to International Standard Electric Corporation, New York, N. Y., a corporation of Delaware Application March 19, 1957, Serial No. 647,120

Claims priority, application Germany March 23 1956

4 Claims. (Cl. 178—4.1)

Figure 1:
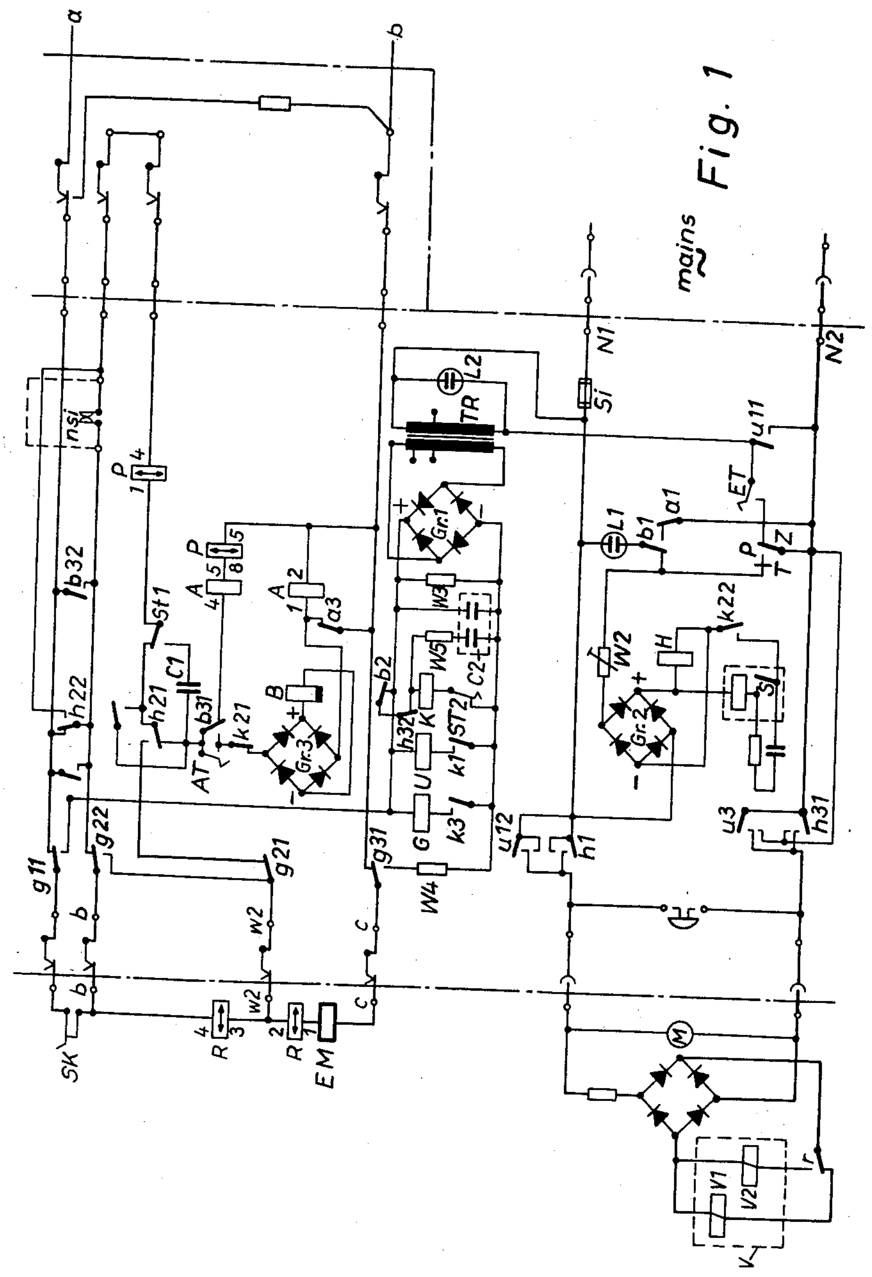

Printing telegraph apparatuses are known which, in addition to the keyboard with a transmitter equipment and a receiver, are adapted to print the received signals or characters and are provided with attachments such as tape transmitters and reperforators. These attachments can be operated selectively, so that it is possible, for example, to not only print a received message, but to also perforate a tape at the same time. Also the outgoing messages can thus not only be typed on the home printer, but may also be perforated simultaneously into a paper tape. Almost the same applies to a built-in tape transmitter. A previously produced perforated tape may be inserted in the tape transmitter, which may be switched on after having transmitted, prior thereto, the traffic routing signals such as serial number, date, heading, address, etc., which are necessary for a proper operation.

In the case of printing telegraph apparatus equipped with such attachments it has proved to be of a disadvantage that the tape transmitter with the inserted perforated tape is switched on when no connection has been established. If this station is called, then automatically, upon the starting of the printing telegraph motor, the tape transmitter also will start and will transmit the content of the inserted perforated tape. In this way it can easily happen that a message is sent to a subscriber who was not intended to receive same. In order to avoid such a disadvantage it is proposed according to the invention to insert into the telegraph circuit a telegraph relay or any other suitable element which is responsive to the direction of current and which, either directly or indirectly, is capable of switching-off the tape transmitter, the reperforator or any other attachment, as soon as the direction of current in the telegraph circuit is reversed. To this end it is necessary that the polarity of the internal source of line signals be opposite to that normally existing on the telegraph line in the transmitting condition.

In this way it is accomplished that the same signals or criteria, which are used for switching a printing telegraph machine on or off connected to the public telegraph network, may be used simultaneously to control any attachments which may be attached to the machines. The inventive arrangement is also effective in cases where, for instance, a subscriber has internally produced a perforated tape, and intends to type the contents of this tape again internally for his own purposes with the aid of his tape transmitter. If, in such a case, there should happen to arrive a call from the outside, then also this time the telegraph relay in the telegraph line will become effective and will switch-off the tape transmitter, because—as already mentioned hereinbefore—the polarity of the internal source of line signal is of the opposite direction than the polarity of the telegraph line when in the writing or transmitting condition. In this way a calling subscriber will not receive a message which is not intended for him. Hence in the case of an incoming call the home printer will be capable of performing the receiving and the printing, but any perforated tape which should happen to be inserted in the tape transmitter will be prevented from being transmitted, and the received message will also not be perforated. The invention is so designed that there are not required any alterations to the existing printing telegraph systems, and that, in addition thereto, for any new printing telegraph systems there is not required an additional connecting cord or line between the printer and the telegraph line.

Figure 2:
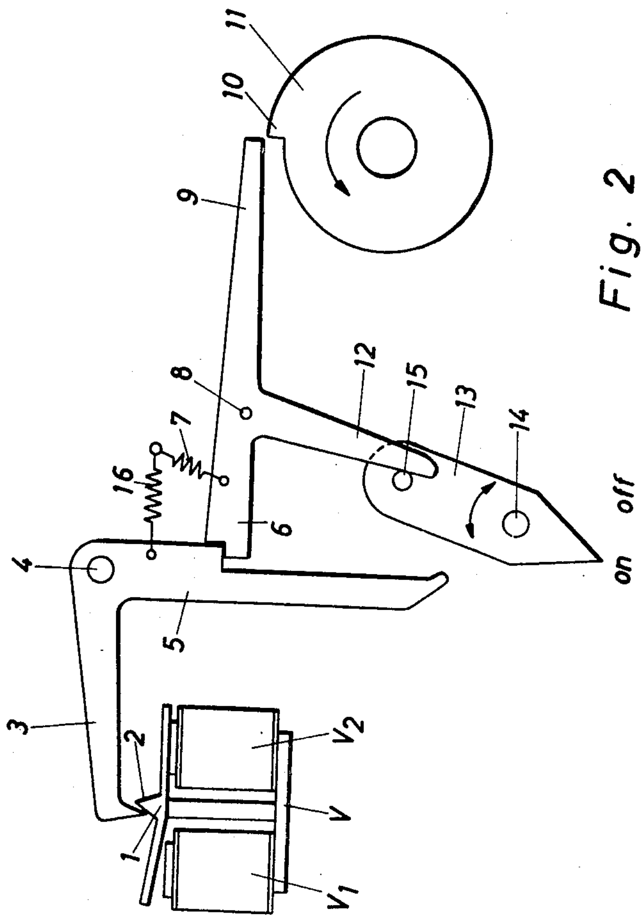
Figure 3:
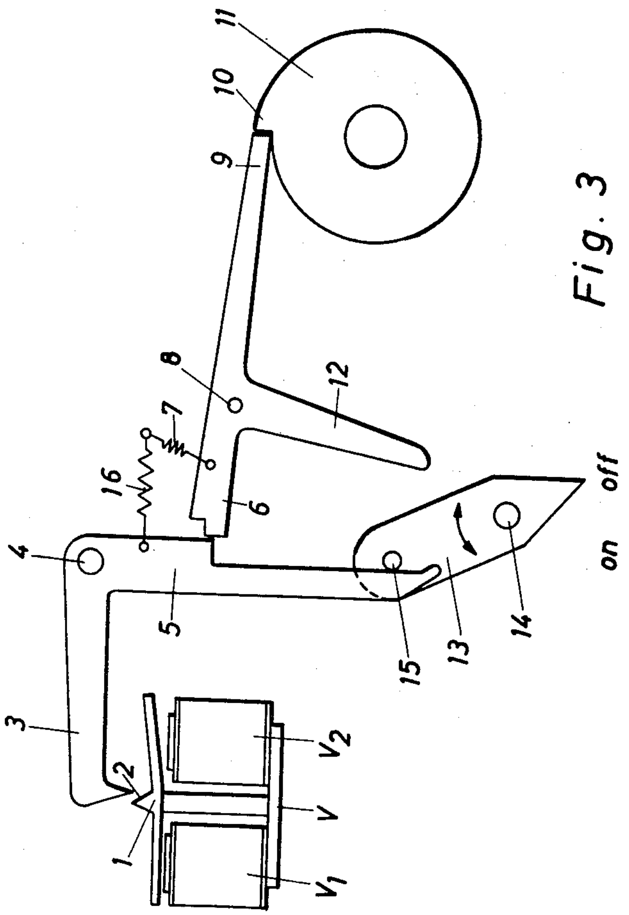

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 is a diagram of a circuit using my invention as applied to a known type of printing telegraph apparatus, Fig. 2 is a schematic showing of a polarity supervisory relay adapted to control operation of a tape transmitter or similar attachment to a printing telegraph apparatus, shown in a position where no control is exercised; and Fig. 3 is a schematic showing similar to Fig. 2 with the difference that the supervisory relay is shown exercising control over the apparatus.

Referring now to Fig. 1, there is shown a diagram of a known circuit using my invention. It is used for switching the teleprinter on and off and in telegraph dial systems it permits dialing of the wanted subscriber; or in manual exchange operation, calling of the manual exchange.

By means of the subscriber box the teleprinter can be cut off from the exchange line and employed for internal purposes. Message tapes can then be prepared with the aid of the reperforator and perforator built into the page printer for later transmission through the built-in transmitter distributor. Moreover, the page printer may be used for exercising purposes.

For internal operation, line current for internal operation is furnished by a power supply built into the subscriber box. Upon arrival of a call the subscriber box emits a buzzer signal, and after a period it automatically switches the teleprinter to exchange operation. The teleprinter station therefore remains ready for reception also in case of internal operation.

In the rest condition, a small rest current (5 ma. approx.) flows from the exchange, causing permanent excitation of the A-relay. The dial disk is locked by the operated A-relay.

+ (from the exchange), *a*-lead, *h*22, *nsi*,
P4–1, *St*1, *h*21, *b*31, A4–5, P8–5, *b*-lead, —

Contacts *a*1 and *a*3 are thus opened. The armature *p* of the polarized relay P is connected to contact Z. The contact of the relays R is in the position as shown in the drawing.

Depressing the calling key AT shunts the high-ohmic coil 4—5 of the A-relay and increases the line current to approximately 40 ma.

+, *a*-lead, *h*22, *nsi*, P4–1, *St*1, *h*21, AT, *k*21, *Gr*3, B,
*Gr*3, A1–2, *b*–lead, —

Relay B is operated, and coil A4–5 is cut out through *b*31. By means of coil A1–2, relay A holds in until arrival of the dial signal. This consists of a transient current interruption. This causes release of relay A. When the current interruption ceases, relay A is disabled to operate once more via its coil 1–2M, since this coil is bridged by contact *a*3, and coil 4—5 is moreover cut out by *b*31. (During the transient current interruption, relay B remains excited.)

The following current path is now provided for lamp L1:

Mains, N1, *Si*, L1, *b*1, *a*1, N2, Mains

The lighting of the lamp indicates to the subscriber that he may proceed to dial (dial signal). The dial disk had been unlocked by the release of the A–relay. During emission of the dial impulses, the *nsi* contact will alternately open and close the following current path, in the rhythm of the dial pulses.

+ TB, *a*–lead, *b*32, *nsi*, P4–1, S*t*1, *h*21, *b*31, *k*21, G*r*3, B, G*r*3, *a*3, *b*–lead, —

Due to its delay coil, the B–relay remains operated also during the interruption periods. In the automatic exchange, the dial pulses cause setting of the respective group and line selectors. If the wanted subscriber is free, the line current polarity is reversed by the exchange.

Owing to this polarity reversal, the armature of the polarized relay P will shift to T, and relay H is thereby connected to the mains voltage:

Mains, N1, S*i*, G*r*2, H, G*r*2, W2, *p*N2, Mains

The teleprinter motor M is cut in by contacts *h*1 and *h*31. Contact *h*22 removes the shunt from the transmitting contact SK. Contact *h*21 places the receiving magnet into the line loop and simultaneously cuts out relay B. Contact *h*22 shorts the *nsi* contact, so as to render any further dial impulses ineffective. The lamp L1 remains on also after the shifting of contact *b*1.

Mains, S*i*, L1, *b*1, *p*, Mains

The following path is thus provided for the line current.

+, *b*–lead, *g*31, EM, R, *g*21, *h*21, S*t*1, P1–4, *h*22, *g*22, SK, *g*11, *a*–lead, —

Starting of the teleprinter is an indication that the connection has been established and that teleprinting can be started.

When teletyping is finished, the clearing button S*t*1 will be depressed. The circuit is thereby cut open and a long current interruption (making current) is sent to the exchange. This causes in the exchange clearing of the connection, and another polarity reversal in the subscriber line (+ at the *a*–lead). During the polarity reversal, relay P receives a charging impulse via the capacitors C1 which resets the armature of relay P to Z. The teleprinter motor as also the lamp L1 are cut out.

If the subscriber is called, then the rest current is reversed from the exchange side, thereby shifting the armature of the polarized relay P. The circuits described are thereby constituted, resulting in applying mains voltage to the teleprinter motor and lamp L1. In addition, the receiving magnet EM, the relay R and the transmitting contacts are connected into the line loop, so as to make the subscriber ready for operation. After termination of the writing condition, the motor and the lamp are cut out through the application of plus-potential to the *a*–lead. Relay P resets its armature to Z, and after release of relay H the rest condition is reestablished.

In the internal operation (perforator operation), when the On-button ET is depressed, the home supply facility is placed in operation. The teleprinter thereby receives its line current, and the motor is started simultaneously. The red signal lamp L2 lights up, indicating the ready-to-operate condition. The following switching processes are thereby implied.

The rest condition mentioned above is so changed by depressing the button ET that the home supply is connected to the mains. This entails operation of relays K, U and G, and the transmitting contacts, as also the receiving magnet are changed over from the exchange line to the home power supply. Furthermore, the motor is connected to the mains.

$$\text{Mains, N2}, p, \text{ET}, \frac{\text{T}r}{\text{L2}}, \text{S}i, \text{N1, Mains}$$

$$\frac{+\text{G}r1}{\text{W3 C2}}, b2, h32, \frac{\text{K1–5}}{\text{W5, C2}}, \text{S}t, \frac{-\text{G}r1}{\text{W3 C2}}$$

Upon operation of the K–relay the U and the G–relay are supplied with voltage via K1 and K3:

$$\text{Mains, N2}, u11, \frac{\text{T}r}{\text{L2}}, \text{S}i, \text{N1, Mains}$$

$$\frac{+\text{G}r1}{\text{C2 W3}}, b2, h32, \frac{\text{K}}{\text{W5, C2}}, \text{S}t2, \frac{-\text{G}r1}{\text{C2 W3}}$$

$$\frac{-\text{G}r1}{\text{W3 C2}}, k1, \text{U}, \frac{+\text{G}r1}{\text{W3 C2}}$$

$$\frac{-\text{G}r1}{\text{W3 C2}}, k3, \text{G}, \frac{+\text{G}r1}{\text{W3 C2}}$$

The line current circuit is constituted as follows:

$$\frac{+\text{G}r1}{\text{W3 C2}}, g11, \text{SK}, g22, g21, \text{R, EM}, g31, \text{W4}, \frac{-\text{G}r1}{\text{W3 C2}}$$

The following circuit is set up for the motor:

Mains, N2, *u*3, motor M, *u*11, S*i*, N1

When the operational condition "Perforation" is concluded, the regulating circuit of the K–relay is interrupted by depressing the clearing button S*t*2. The K–relay releases, and the exciting circuits of the U and G–relay are also interrupted. By removing the current from the G–relay, the transmitting contacts SK, the relay R and the receiving magnet EM are changed over from the home source to the free exchange line. Simultaneously, release of the U–relay switches off the home current source and the motor. The rest condition is consequently reestablished.

If the subscriber, by employing his home current source, carries out the perforator operation as described and if he is called by another subscriber during this period, then owing to the polarity reversal of the exchange line thereby involved the P–relay is shifted from the mark to the space condition. The H–relay is consequently operated and breaks the contact *h*32 in the internal current supply. The K–relay is thereby separated from the home current supply. However, it does not release immediately, as it holds in further 3 seconds, via the delay link C3, W5. Concurrently with the shifting of the P–relay, the buzzer S receives voltage via contact *k*22, thereby announcing aurally to the subscriber the incoming call. Simultaneously, the call is indicated by lamp L1.

In order to prevent the built-in tape transmitter, in the case of a non-observance of both the optical and acoustical signal, from transmitting an unintended message, as well as for preventing the incoming text from being perforated by the built-in tape transmitter and thus causing a mutilation of any probably existing internal operation tape, that has started to be perforated, the relay R is changed over. This changing-over of the R–relay is effected upon reversing of the contacts *g*21, *g*22 and *g*31, so that consequently also the direction of current flux in the winding $R_{1-2}$ is reversed.

In another case the winding $R_{3-4}$ causes a special effect, namely whenever a subscriber, at his switched-off machine, switches-on the tape transmitter and does not continue in proceeding to dial the wanted subscriber, but instead leaves his operating position and, consequently, his machine unattended. If, in such a case, a call would be received from another subscriber then the tape transmitter would start to operate and, of course, would transmit a text to a wrong subscriber. In such a case, therefore, the winding $R_{3-4}$ prevents the message from being transmitted, because in the rest condition the subscriber line has another polarity than in the printing condition. Unlike the winding $R_{1-2}$, the winding $R_{3-4}$ also operates in cases where the AT button, the button $St1$ or the contacts $h22$, $p32$, $nst$ are accidentally actuated just during the change-over process.

Referring now to Fig. 1, there is schematically shown the above mentioned double winding relay R, which is provided for supervising the polarity, and which relay is disposed inside the printer and having its high-resistance winding $R_{3-4}$ between the lines $b$ and $w2$ on the one hand, and with its secondary, low-resistance winding $R_{1-2}$ in the lines $w2$ and $c$.

Under the condition that the requirement is met, according to which the polarity of the internal line signal circuit, which is fed by the rectifier $Gr1$, is contrary to the polarity of the telegraph line in the transmitting condition, there is reversed the armature of relay R at every change of the operating conditions. By this reversal of the armature of the relay R an internal circuit arranged inside the teleprinter is acted upon in such a way that alternately the coils V1 and V2 of a relay V are energized. These coils V1 and V2 are arranged at the switch-over device that is shown in Figs. 2 and 3 and which, at the reversal of the armature 1 of relay V, is changed to its position "Off." The switch-over device therefore, may be arranged as a special attachment, or else in the tape transmitter itself.

The switch-over device as shown in the circuit of Fig. 1 and in the arrangement of Fig. 2, controls the switching-on of the tape transmitter or of any other similar attachment to the printer. With the aid of this arrangement the tape transmiter may be manually switched on or off at any time. Apart therefrom the tape transmitter will be switched off automatically as soon as the nature of operation is changed. Because in this case, as above-mentioned, the relay R reverses its armature and, at the same time, a transfer contact *r*. Instead of the coil V1 there is now energized the coil V2. Consequently, the armature 1 of the relay V will change its position and will lift with its toothed edge 2 the bell-crank lever 3. Thereby the lever 3 is turned around the center of rotation 4 in a clockwise direction, so that its arm 5 will be moved to the left.

The arm 5 is provided with a shoulder portion 5*a* which cooperates with a shoulder 6 provided in the third arm of a three-arm bell crank intermediate lever 6*a*. Lever 6*a* is biased to rotate in a clock-wise direction about pivot 8 by means of spring element 7 coupled to said third arm. The second arm 9 of lever 6*a* cooperates with a step notch 10 in the periphery of cam 11. The cam 11 is fixedly mounted on shaft 11*a* which shaft constitutes a clutch or coupling arrangement for the tape transmitter. The shaft 11*a* is coupled to the drive motor (not shown) by means of a friction drive clutch (not shown). Since the last mentioned elements are well known in the art and are not part of this invention they are not further shown. The third arm 12 of the lever 6*a* cooperates with a pin 15 mounted on a toggle arm 13 and extending in the path of arm 12. Arm 13 is pivoted at point 14 and controls an on-off electrical switch not further shown. The last mentioned switch controls operation of the tape transmitter drive motor (not shown).

The operation of the device is as follows:

Energization of winding V1 as shown in Fig. 3 causes the shoulder 5*a* of bell crank arm 5 to move out of contact with the shoulder 6 in lever 6*a* permitting spring 7 to urge lever 6*a* in a clockwise direction and the end 9 thereof to be placed in the path of notch 10 in cam 11. Cam 11 is thereby halted in its rotation. The arm 12 of lever 6*a* moves in a clockwise direction against pin 15 and toggle arm 13 snaps into its left-hand position. To re-start the motor of the tape transmitter manual operation of toggle arm 13 toward the right is necessary and will cause the reset of lever 6*a* to the position shown in Fig. 2.

The arm 5 will reengage the shoulder 6 because of the tension exerted by spring element 16 which normally urges arm 5 against lever 6*a* except when pin 15 abuts against the end of arm 5 as shown in Fig. 3.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A control arrangement for attachments to printing telegraph apparatus coupled to a line circuit comprising a first switch responsive to the polarity of said line circuit, a second switch for controlling operation of a motor driving said attachment, a control device for actuating said second switch under control of said first switch; said control device comprising: an electromagnet having a pair of windings and a common armature in magnetic relationship with said windings, said armature adapted to be moved in a first direction upon energization of a first of said windings and in the opposite direction upon energization of the other of said windings, said windings adapted to be selectively energized under control of said first switch, and actuating element adapted to cooperate with said second switch, means to normally urge said actuating element in a first direction, a latch member intermediate said armature and said actuating element and engaging said actuating element for normally maintaining said actuating element in fixed position and said second switch in a first position, said latch member adapted to move under control of said armature out of engagement with said actuating element whereby said second switch is moved to a second position and common means to reset said second switch, said latch member and said actuating element.

2. An arrangement as claimed in claim 1, wherein said first switch is coupled to said line in a manner to be responsive to a potential of opposite polarity to normal telegraph operating potential.

3. An arrangement as claimed in claim 1, wherein said common armature comprises a toothed element adapted to coact against said latch element upon energization of a first one of said pair of windings.

4. An arrangement as claimed in claim 1 wherein said first swing comprises an electromagnetic relay having a pair of windings of high and low resistance values respectively.

No references cited.